United States Patent [19]

Isenberg et al.

[11] Patent Number: 5,492,777
[45] Date of Patent: Feb. 20, 1996

[54] ELECTROCHEMICAL ENERGY CONVERSION AND STORAGE SYSTEM

[75] Inventors: Arnold O. Isenberg; Roswell J. Ruka, both of Pittsburgh, Pa.

[73] Assignee: Westinghouse Electric Corporation, Pittsburgh, Pa.

[21] Appl. No.: 378,299

[22] Filed: Jan. 25, 1995

[51] Int. Cl.⁶ .................................................. H01M 08/18
[52] U.S. Cl. .............................. 429/17; 429/30; 429/221; 429/21
[58] Field of Search ................................ 429/30, 17, 27, 429/49, 221, 19, 21; 204/421

[56] References Cited

U.S. PATENT DOCUMENTS

| | | | |
|---|---|---|---|
| Re. 28,792 | 4/1976 | Ruka et al. | 204/1 T |
| 3,939,257 | 2/1976 | Pangborn et al. | 423/658 |
| 3,981,745 | 9/1976 | Stedman | 429/21 |
| 4,395,468 | 7/1983 | Isenberg | 429/31 |
| 4,412,895 | 11/1983 | Lu | 204/129 |
| 4,474,862 | 10/1984 | Buzzelli et al. | 429/17 |
| 4,490,444 | 12/1984 | Isenberg | 429/31 |
| 4,745,038 | 5/1988 | Brown | 429/27 |
| 4,751,152 | 6/1988 | Zymboly | 429/31 |
| 4,839,247 | 6/1989 | Levy et al. | 429/21 |
| 4,983,471 | 1/1991 | Reichner et al. | 429/19 |
| 5,143,800 | 9/1992 | George et al. | 429/20 |

Primary Examiner—Prince Willis, Jr.
Assistant Examiner—Carol Chaney

[57] ABSTRACT

An apparatus and method for storing electrical energy as chemical energy and recovering electrical energy from stored chemical energy. A solid oxide electrolyte electrochemical cell is operated in two modes. The first, energy storage, mode comprises steps of: (A) supplying electrical energy and steam to a solid oxide electrolyte electrochemical cell operating between 600° C. and 1200° C. as an electrolysis cell, to produce $H_2$ and $O_2$; (B) passing the $H_2$ gas so produced into an energy storage reactor containing iron oxide, to produce iron metal and steam; (C) recirculating the steam produced in the energy storage reactor to the cathode of the electrolysis cell; and (D) repeating steps (A) to (C) until the iron oxide is converted to iron metal, for chemical storage of electrical energy. The second, energy recovery, mode comprises steps of: (E) supplying steam to the energy storage reactor containing iron metal, to produce iron oxides and $H_2$ gas; (F) passing this $H_2$ gas to the fuel anode of an electrochemical cell operating as a fuel cell, and supplying $O_2$ gas to the air cathode of the electrochemical cell, to produce electrical energy and steam at the fuel anode; (G) recirculating the steam so produced to the energy storage reactor bed; (H) repeating steps (E) to (G) until the iron metal is converted to iron oxide and $H_2$ gas; and (I) recovering the electrical energy produced.

20 Claims, 4 Drawing Sheets

ELECTROCHEMICAL ENERGY CONVERSION AND STORAGE SYSTEM

FIELD OF THE INVENTION

The invention relates to the field of energy conversion and storage in electrical power plant operations during off-peak power plant operations. More particularly the invention relates to electrochemical cells, such as a high temperature, solid oxide electrolyte fuel cells operated in an electrolysis mode, used for converting electrical energy to chemical energy in the form of hydrogen gas, which converts iron oxide to metal, thereby forming compactly stored chemical energy, and the stored chemical energy can later be reconverted via hydrogen into electrical energy in electrochemical fuel, such as high temperature, solid oxide electrolyte fuel cells operated in a fuel cell mode.

Even more particularly, the invention is directed to an apparatus for and a method of convening and storing of electrical energy in the form of chemical potential energy during off-peak electrical power plant operations by the following operations: electrolyzing $H_2O$ (steam) to $H_2$ and $O_2$ in an electrochemical electrolysis cell operating on electrical energy supplied from an external source; passing the $H_2$ produced through a storage reactor bed of iron oxide (FeO) that is thermally coupled to a heat source, wherein the iron oxide (FeO) is reduced to iron metal (Fe) to form stored chemical potential energy for extended periods; later, when electrical energy is called for, passing $H_2O$ (steam) through the storage reactor bed, wherein the iron metal (Fe) is oxidized to FeO and chemical potential energy is recovered as $H_2$; and then oxidizing the $H_2$ recovered in an electrochemical fuel cell to generate electrical energy for transmission.

BACKGROUND OF THE INVENTION

Base load power plants such as nuclear power plants and combustion-thermal power plants are preferably operated under a constant load. Peak power electrical energy requirements are basically undesirable from a standpoint of highly efficient generation of electrical energy, but must be met on a daily and seasonal routine. Peak power electrical energy demand penalizes power generation facilities basically in the form of increased capital cost and generally higher fuel cost. To make additional electrical power capacity available during peak demand periods, higher than required capacity usually exists during off-peak periods which therefore requires energy storage systems.

The periods of low power demand, thus, leave the base load power plant operating under less than optimal conditions and excess power generation capacity is available during such periods. It is very desirable in this instance to store electrical energy efficiently and at low costs, and many schemes have been proposed for such energy storage facilities. For example, "pumped hydro" and "compressed air" energy storage systems have been used. These systems store energy in the form of potential energy during off-peak hours and return the energy to the power group during peak power demand periods. Such practical schemes are dependent on geography and geology and require significant space, and, therefore, the siting of such energy storage facilities is not flexible enough for wide-spread applications.

Electrochemical energy storage systems however would have distinct advantages over other systems. Electrochemical energy storage systems are highly compact because chemical energy can be stored in a small volume. For this reason, it can be modular in construction. It also has a potential for being the most energy efficient method for storage of electrical energy since the energy conversion of electrical to mechanical and back to electrical energy is avoided.

High temperature, solid oxide electrolyte fuel cells and multi-cell generators and configurations thereof designed for converting chemical energy into direct current electrical energy at temperatures typically in the range of 600° C. to 1200° C. are well known and taught, for example, in U.S. Pat. Nos. 4,395,468 (Isenberg) and 4,490,444 (Isenberg). These high temperature, solid oxide electrolyte fuel cells are known to operate in two modes, namely in an electrochemical power generation mode using gaseous fuel such as hydrogen or carbon monoxide derived from reformed hydrocarbons, coal, or the like, which is converted to direct current electrical energy, and in an electrochemical power usage mode using steam and carbon dioxide which is converted via electrolysis into oxidizable fuels such as hydrogen or carbon monoxide, respectively, as generally taught in U.S. Pat. No. Re. 28,792 (Ruka, et al.). This capability of the high temperature, solid oxide electrolyte fuel cells is unique among fuel cell types and is due to the fact that the solid oxide electrolyte fuel cells are solid state devices which operate in a temperature range of about 600° C. to 1200° C. At these temperature levels, the thermal energy is high enough that electrolysis can proceed without using noble metal catalysts at the electrodes, and the laws of thermodynamics predict, and are confirmed by experiment, a reduced electrical power requirement for electrolysis as compared to low temperature electrochemical batteries. For example, sodium-sulfur batteries that operate at about 350° C. have been investigated for use in storing off-peak electrical energy.

Producing fuels, such as hydrogen fuel gas, by electrolysis is a basic requirement for an electrochemical energy conversion and storage system. The energy storage in the form of hydrogen fuel gas through the electrolysis of steam, however, would require bulky gas storage facilities and would restrict the siting of this type of energy conversion and storage system. Therefore, there is a need to convert the bulky hydrogen energy carrier into another form of energy carrier which is not bulky and can be stored in a compact arrangement. At the appropriate demand time, this potential energy can be called into service by reconversion to hydrogen as a fuel to a fuel cell generator to generate electrical energy.

What is needed is an efficient and compact method of storing electrical energy in the form of chemical energy that is relatively compact and can be stored indefinitely for later reconversion to electrical energy for electrical power transmission.

It would be advantageous and it is an object of the invention to derive an energy storage and conversion system from high temperature, solid oxide electrolyte fuel cells operating in two modes, i.e., 1. an electrolysis mode for electrical energy storage and 2. a fuel cell mode for electrical energy recovery, using iron metal and iron oxide (Fe/FeO) beds as the energy storage mediums. In the first mode of operation or energy storage mode of the invention, a high temperature, solid oxide electrolyte fuel cell powered with electrical energy supplied from an electrical power plant electrolyzes incoming $H_2O$ (steam) to $H_2$ and $O_2$. The $H_2$ gas thus produced is fed to a heated Fe/FeO storage reactor bed containing iron oxide (FeO) which is reduced to iron metal (Fe) as the energy storage medium, and $H_2O$ (steam)

is produced. The $H_2O$ (steam) produced in the energy storage reaction is recirculated to the solid oxide electrolyte fuel cell for electrolysis and the $H_2$ produced is recirculated to the Fe/FeO storage reactor bed again and again until there is substantially complete conversion of FeO to Fe.

In the second mode of operation or the energy recovery mode of the invention, the Fe/FeO storage reactor bed now containing iron metal (Fe) reduces incoming $H_2O$ (steam) to $H_2$ gas which is an oxidizable electrochemical fuel for electrical power generation in a high temperature, solid oxide electrolyte fuel cell. The $H_2$ gas produced is fed to a high temperature, solid oxide electrolyte fuel cell and is electrochemically reconverted into electrical energy and $H_2O$ (steam). The $H_2O$ (steam) produced in the electrochemical oxidation is recirculated to the Fe/FeO storage reactor bed and converted to $H_2$ again and again until there is substantially complete conversion to gaseous fuel and discharging of Fe to FeO. The second mode of operation can also use over the fence fuel such as natural gas by using the Fe/FeO beds as reformers, thereby increasing the efficiency of the energy storage and conversion system of the invention, as more completely described in U.S. patent application Ser. No. 08/378,298 (Isenberg) entitled *A Hydrocarbon Reformer For Electrochemical Cells* filed currently herewith which is incorporated by reference herein, in its entirety.

The iron/iron oxide (Fe/FeO) beds therefore undergo multiple cycles of oxidation and reduction reactions according to Equation (1).

$$FeO + H_2 \underset{\text{generation}}{\overset{\text{storage}}{\rightleftharpoons}} Fe + H_2O \text{ (steam)} \quad (1)$$

Thus, a first storage mode involves conversion of direct current electrical energy, typically supplied from an electrical power plant during off-peak hours, by the electrolysis of steam coupled with chemical energy storage by the reduction of iron oxide by hydrogen gas in an iron oxide/iron metal storage bed and a second recovery mode involves the recovery of direct current electrical energy from the iron oxide/iron metal storage bed by the oxidation of iron by steam to iron oxide and hydrogen gas which is subsequently electrochemically oxidized into direct current electrical energy. The two modes of operation of the system are performed by high temperature, solid oxide electrolyte fuel cells (SOFC). The system can also be operated in a third energy generation mode by using the iron oxide/iron metal beds as a reformer for natural gas also in conjunction with high temperature solid oxide electrolyte fuel cells.

SUMMARY OF THE INVENTION

It is an object of the invention to provide an energy conversion and storage system for electrical power plants during low power demand periods by converting power plant generated electrical energy to chemical energy using at least one electrochemical fuel cell operated in an electrolysis mode and at least one iron oxide/iron metal energy storage bed for energy storage and later by recovering the stored chemical energy as electrical energy using at least one iron oxide/iron metal energy storage bed and at least one electrochemical fuel cell operated in a generation mode.

It is another object of the invention to provide an energy conversion and storage system by storing electrical energy as chemical energy by the electrolysis of $H_2O$ (steam) in a high temperature, solid oxide electrolyte electrolysis cell for $H_2$ production and subsequent storage of this chemical energy in the form of Fe metal, by reduction of FeO with $H_2$ in a storage reactor bed, and later by converting the stored chemical energy to electrical energy by the reaction of $H_2O$ (steam) with the Fe in the storage reactor bed for $H_2$ gas production and subsequent use of the $H_2$ gas produced in the high temperature, solid oxide electrolyte fuel cell generator as fuel to generate and recover electrical energy.

These and other objects of the invention are accomplished by an apparatus for and a method of storing electrical energy as chemical energy and recovering the electrical energy from stored chemical energy by operating an electrochemical cell such as a high temperature, solid oxide electrolyte electrochemical cell, in two modes, in an energy storage mode and an energy recovery mode, characterized by the steps in an energy storage mode of: (A) supplying external electrical energy to electrical leads and $H_2O$ (steam) gas to a cathode of at least one electrochemical cell operating as an electrolysis cell using a solid oxide electrolyte between an anode and the cathode, the electrolysis cell operating at a temperature of between about 600° C. to 1000° C., to produce $H_2$ gas along the cathode and $O_2$ gas along the anode; (B) passing the $H_2$ gas produced along the cathode of the electrolysis cell into a energy storage reactor containing iron oxide (FeO) operating at a temperature of between about 600° C. to 800° C., to produce iron metal (Fe) in the energy storage reactor and $H_2O$ (steam); (C) recirculating the $H_2O$ (steam) produced in the energy storage reactor to the cathode of the electrolysis cell to be electrolyzed; and, (D) repeating steps (A) to (C) until conversion of iron oxide (FeO) to iron metal (Fe) is substantially complete, for chemical energy storage of electrical energy; and, further characterized by the steps in an energy recovery mode of: (E) supplying $H_2O$ (steam) gas to the energy storage reactor containing iron metal (Fe) operating at a temperature of between about 600° C. to 800° C., to produce iron oxide (FeO) in the energy storage reactor and $H_2$ gas; (F) passing the $H_2$ gas to a fuel anode of the at least one electrochemical cell operating as a fuel cell using a solid oxide electrolyte between an anode and a cathode, and supplying $O_2$ gas or air to an air cathode of the at least one electrochemical cell operating at a temperature of between about 600° C. to 1200° C., to produce electrical energy along the external leads and $H_2O$ (steam) along the fuel anode; (G) recirculating the $H_2O$ (steam) produced at the fuel anode of the fuel cell to the energy storage bed; (H) repeating steps (E) to (G) until substantially complete conversion of iron metal (Fe) to iron oxide (FeO) and $H_2$ gas for electrical energy recovery from chemical energy storage; and, (I) recovering the electrical energy produced.

The invention also resides in an electrochemical energy conversion and storage device made from solid oxide electrochemical cells and operational in two modes: (1) an energy recovery mode and (2) an energy storage mode that is characterized by: (A) an electrochemical cell chamber, the cell chamber containing at least one electrochemical cell bundle, the cell bundle containing a plurality of parallel, axially elongated, interconnected electrochemical cells, each cell including a porous exterior electrode of for example nickel-zirconia cermet, a porous interior electrode of for example strontium doped lanthanum manganite, and a gastight solid oxide electrolyte of for example yttria or scandia stabilized zirconia between the two electrodes; (B) a combustion chamber connected to the cell chamber; (C) at least one combustion exhaust channel connected from the combustion chamber to the atmosphere; (D) at least one energy storage chamber connected to the cell chamber, the energy storage chamber containing either iron oxide in the energy storage mode of operation or iron metal in the energy recovery mode of operation; (E) at least one recirculation gas channel connected from outside of the porous exterior electrode in the cell chamber to the energy storage chamber; (F) a steam inlet connected to the outside of the porous exterior electrode in the cell chamber; (G) an oxidant inlet connected to the inside of the porous interior electrode in the cell chamber; and, (H) electrical leads connected from the cell bundles in the cell chamber to an external circuit, in which the device can be operated in an energy storage mode by supplying direct current electrical energy from the external circuit through the leads to the electrochemical cells and steam through the steam inlet to the porous exterior electrode and providing the energy storage chamber in the iron oxide state, and in which the device can be operated in an energy recovery mode by providing the energy storage chamber in the iron state and supplying steam through the steam inlet to the energy storage chamber and an oxidant through the oxygen inlet to the porous interior electrode and recovering direct current electrical energy from the electrochemical cells through the leads to the external circuit.

There exist several iron oxide compositions, such as FeO, $Fe_2O_3$, $Fe_3O_4$. For simplicity we name here only FeO, since it is in chemical equilibrium with iron (Fe). However the formation of the other oxides of iron in the scheme of the invention is not excluded.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS OF THE INVENTION

The term "electrolysis cathode" and "fuel anode" as used herein means that electrode in contact with a hydrogen species such as $H_2O$ (steam), $H_2$ gas, or hydrocarbon fuel, such as natural gas. The term "electrolysis anode" and "oxidant cathode" as used herein means that electrode in contact with an oxygen species, such as $O_2$ or air. The term "spent" as used herein means partially reacted or depleted according to the electrochemical equations described herein. The term "combusted exhaust gas" as used herein means a combusted mixture of hydrogen or fuel with oxidant or air. The term "iron oxide" as used herein includes several iron oxide compositions, such as FeO, $Fe_2O_3$, $Fe_3O_4$, etc. For simplicity, we name only FeO, since it is in chemical equilibrium with iron (Fe). However, the formation of other oxides of iron in the scheme of the invention is not excluded.

Figure 1:
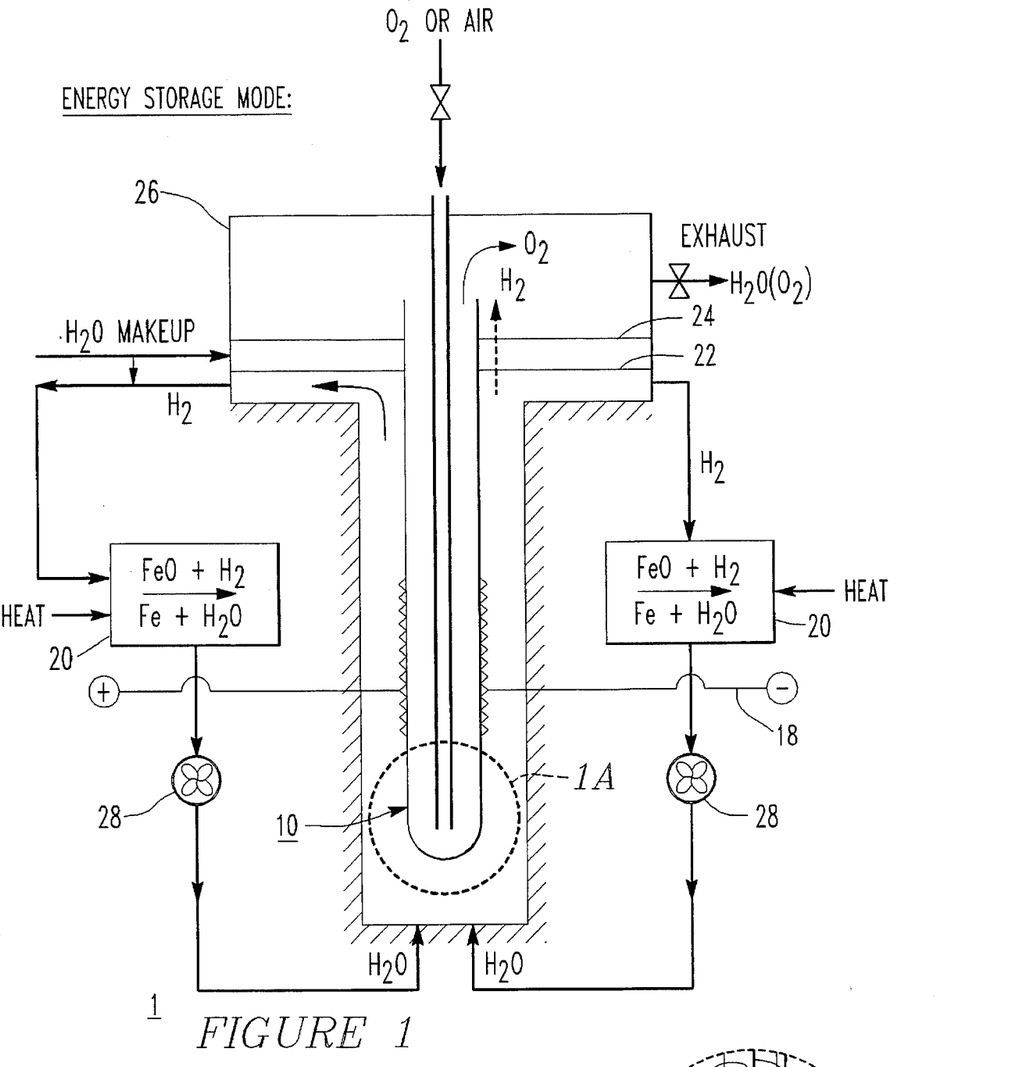
FIG. 1 is a schematic of the electrical energy storage and conversion system of the invention being operated in the energy storage mode.
Figure 1A:
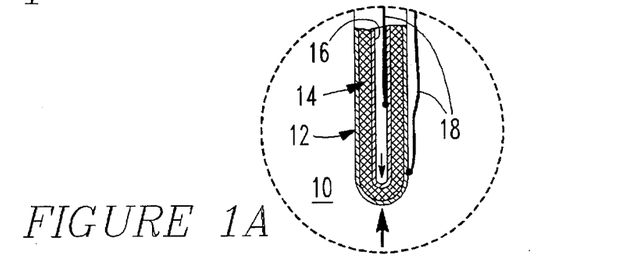

Referring now to FIG. 1, an electrochemical electrolysis cell apparatus 1 operated in an energy storage mode is shown, containing at least one axially elongated, tubular electrochemical electrolysis cell 10, such as high temperature, solid oxide electrolyte electrolysis cell. It should be recognized that a plurality of electrolysis cells 10 can be interconnected in series and/or parallel arrangement as is well known in the art and used. It should also be recognized that the foregoing description of the preferred tubular configuration is merely exemplary and should not be considered limiting in any manner. It is possible that other configurations for the electrolysis cell could be used, for example, flat plate configurations. Each tubular electrolysis cell 10 has an exterior porous electrode or electrolysis cathode 12, an interior porous electrode or electrolysis anode 16, and a gas-tight solid oxide electrolyte 14 between the electrodes, as is well known in the art. It should further be recognized that the location of the anode and cathode can be inverted.

The electrolysis cell 10 is intended to operate at elevated temperatures, over about 600° C., and typically in the temperature range of about 650° C. to 1200° C., preferably about 800° C. to about 1000° C. The cell temperature is maintained by ohmic resistance losses or better by heat exchange with other sources of heat energy. The preferred configuration is based upon an electrolysis cell system, in energy storage mode wherein at temperatures of about 800° C. to 1000° C., an incoming $H_2O$ (steam) is directed axially over the outside of the electrolysis cell 10 and a direct current of electrical energy produced from an electrical power plant (converted by conventional methods from AC to DC current prior to being supplied to the electrolysis cell) is directed through an external load circuit (not shown) by electrical leads 18 to the electrolysis cathode 12. During operation, water (steam) molecules are fed to the electrolysis cathode 12 and pass through the porous cathode and electrochemically react at the solid oxide electrolyte 14/cathode 12 interface, to produce hydrogen gas which exits the electrolysis cell 10 at the cathode. Oxygen ions pass through the solid electrolyte 14 and are then electrochemically oxidized at the solid oxide electrolyte 14/anode 16 interface, to produce oxygen gas which exits the electrolysis cell at the anode and is vented to the atmosphere as a by-product of energy storage or recovered, if possible.

The electrochemical reactions in the electrolysis cell are according to Equations (2), (3) and (4).

$$\text{cathode:} \quad 2H_2O + 4e^- \rightleftharpoons 2O^{2-} + 2H_2 \quad (2)$$

$$\text{anode:} \quad 2O^{2-} \rightleftharpoons 4e^- + O_2 \quad (3)$$

$$\text{overall:} \quad 2H_2O \rightleftharpoons 2H_2 + O_2 \quad (4)$$

The hydrogen gas ($H_2$) produced during electrolysis of steam exits the electrolysis cell 10 and passes through at least one iron/iron oxide (Fe/FeO) storage reactor bed 20 containing compacts of iron oxide (FeO) operating at temperatures of about 600° C. to 800° C., to produce compacts of iron metal (Fe) and water (steam). It should be recognized that a plurality of connected storage reactor beds can be used. The energy storage reaction is represented by Equation (5).

$$FeO + H_2 \rightleftharpoons Fe + H_2O \quad (5)$$

The water vapor produced recirculates and passes again and again to the cathode 12 of the electrolysis cell 10 until substantially all of the FeO is reduced to Fe. Due to the cathode gas recirculation, a very small amount of hydrogen/ steam is required for the substantially complete reduction of a large amount of FeO to Fe via the energy storage mode. When all the FeO in all the Fe/FeO beds 20 is reduced to Fe, the energy storage capability is exhausted.

Since the anode 16 and cathode 12 compartments of the electrolysis cell 10 are not absolutely hermetically sealed against each other, some $H_2$ may be lost to the anode side 16 through two porous barrier boards 22 and 24 which results in an overall system energy loss. In this arrangement, the spent anode and cathode gases as well as anode and cathode compartments are separated from each other through high temperature, porous ceramic fiber boards, such as porous alumina boards (not shown). The absence of rigid seals between electrochemical cells, and anode, as well as cathode compartments permit thermal expansion and contraction of individual tubular cells within large cell bundles and reduces stress within the cell apparatus. However, in a leaking arrangement, it is expected that some loss of $H_2$ gas will occur. To reduce $H_2$ gas loss, make-up steam can be injected into the compartment between the barrier boards 22 and 24 so that $H_2$ transfer is minimized, thereby impeding the loss of $H_2$ during the energy storage mode. Consequently, a part of the make-up steam is vented with the generated $O_2$ during electrolysis and any $H_2$ lost by flow through barriers 22 and 24 is reoxidized with oxygen in a combustion zone 26 and exhausted to the atmosphere. Any exhaust flow from the combustion chamber during energy storage operations is an energy loss flow and should be minimized. Blowers 28 positioned in a low temperature region effect the cathode recirculation.

Figure 2:
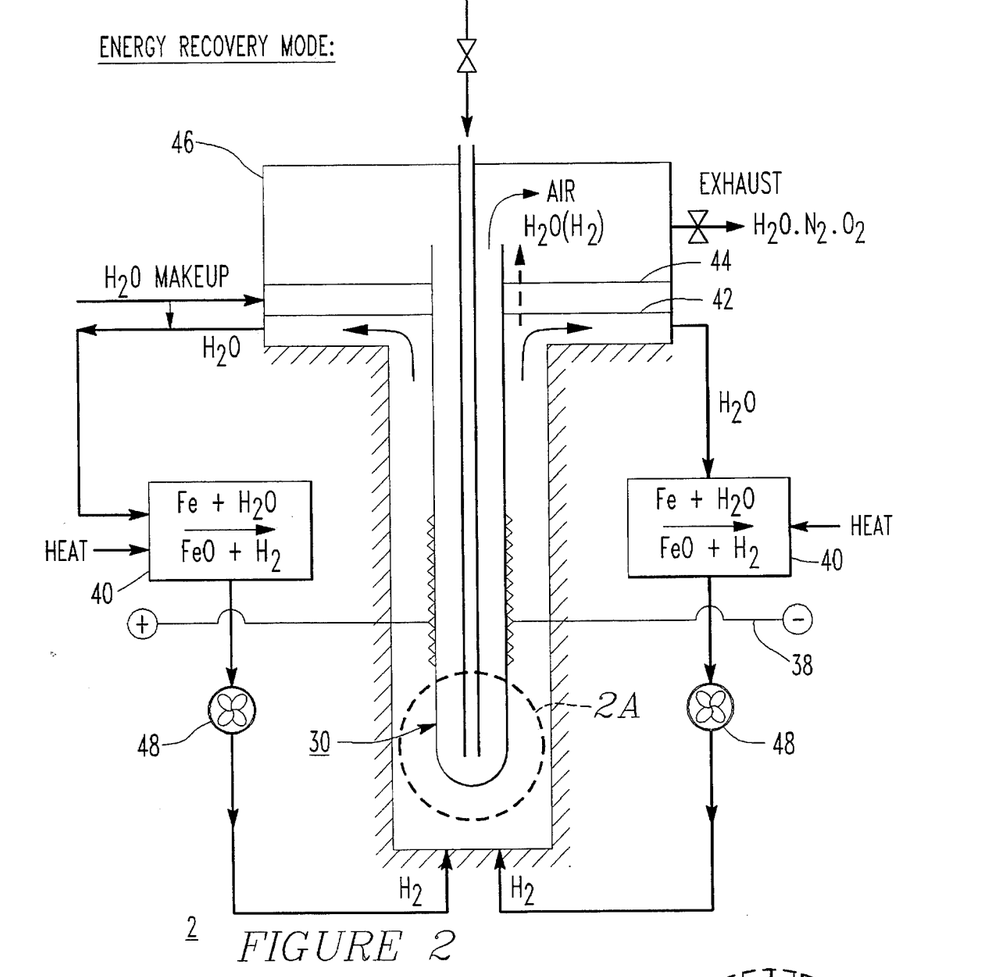
FIG. 2 is a schematic of the electrical energy storage and conversion system of the invention being operated in the energy recovery mode.
Figure 2A:
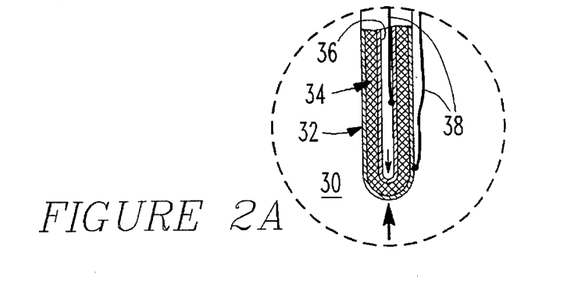

Referring now to FIG. 2, an electrochemical fuel cell apparatus 2 operated in an energy recovery mode is shown, containing at least one axially elongated, tubular electrochemical fuel cell 30, such as a high temperature, solid oxide electrolyte fuel cell. In the energy recovery mode, the stored chemical energy in the form of Fe is converted into direct current (DC) electrical energy, and ultimately to alternating current (AC) electrical energy.

The electrochemical fuel cell apparatus 2 is shown containing at least one axially elongated, tubular electrochemical fuel cell 30, such as high temperature, solid oxide electrolyte fuel cell. It should be recognized that a plurality of fuel cells 30 can be interconnected in series and/or parallel arrangement as is well known in the art and used. It should also be recognized that the foregoing description of the preferred tubular configuration is merely exemplary and should not be considered limiting in any manner. It is possible that other configurations for the fuel cell could be used, for example, flat plate configurations. Each tubular fuel cell 30 has an exterior porous electrode or fuel anode 32, an interior porous electrode or oxidant cathode 36, and a gas-tight solid oxide electrolyte 34 between the electrodes, as is well known in the art. It should further be recognized that the location of the anode and cathode can be inverted.

Moreover, in the energy storage and conversion system of the invention, it should be recognized that the electrochemical electrolysis cell apparatus 1 and the electrochemical fuel cell apparatus 2 can be one and the same, being capable of operating in two reversible modes, an electrolysis or energy storage mode and a fuel cell or energy recovery mode.

The fuel cell 30 is also intended to operate at elevated temperatures in the temperature range of about 600° C. to 1200° C. The fuel cell reaction is exothermic. The preferred configuration is based upon a fuel cell system in an energy recovery mode, wherein an incoming $H_2O$ (steam) passes through the at least one Fe/FeO storage reactor bed 40 in the Fe state. It should be recognized that a plurality of storage reactor beds can be used. It should further be recognized that the at least one storage reactor beds 20 and 40 can be one and the same, being capable of operating in two reversible modes, a reduction or energy storage mode and an oxidation or energy recovery mode. In the Fe/FeO storage reactor bed 40, the energy recovery reaction is the reverse of Equation (5) in that the $H_2O$ (steam) reacts with the Fe at temperatures of about 600° C. to 800° C., to produce FeO and $H_2$ gas. The energy discharge reaction is represented by Equation (6).

$$Fe + H_2O \rightleftharpoons FeO + H_2 \qquad (6)$$

An oxidant, such as air or $O_2$, is directed from an external source through a gas feed tube through the inside of the fuel cell 30 over the interior oxidant cathode 36 and the $H_2$ gas produced is circulated and directed over the exterior fuel anode 32 of the electrochemical fuel cell 30 where the $H_2$ gas is electrochemically oxidized at the anode 32/solid oxide electrolyte 34 interface, by migrating oxygen ions produced at the solid oxide electrolyte 34/cathode 36 interface, to produce $H_2O$ (steam) and release electrons which are carried away through an external load circuit 38 to the cathode, thereby generating a flow of direct current electrical energy, and also thermal energy which can be recovered. The DC electrical energy can be ultimately converted by conventional methods to AC electrical energy for electrical power transmission.

The electrochemical reactions in the electrochemical fuel cell are according to Equations (7), (8) and (9).

$$\text{cathode:} \quad O_2 + 4e^- \rightleftharpoons 2O^{2-} \qquad (7)$$

$$\text{anode:} \quad 2H_2 + 2O^{2-} \rightleftharpoons 2H_2O + 4e^- \qquad (8)$$

$$\text{overall:} \quad 2H_2 + O_2 \rightleftharpoons 2H_2O \qquad (9)$$

The $H_2O$ (steam) produced during electrochemical fuel cell operation at the exterior fuel anode 32 is recirculated over the Fe/FeO storage reactor bed 40 again and again until substantially all of the Fe is oxidized and converted back to FeO and $H_2$ produced is fed as the fuel gas to the fuel cell for electrical power generation.

During the fuel cell mode of operation, excess heat should be dissipated, therefore, an excess of oxidant, air or $O_2$, should be used to cool the fuel cell. Furthermore, due to the incomplete sealing of two porous flow barriers 42 and 44 between the anode 32 and cathode 36 compartments of the fuel cell 30, some loss of water vapor from the recirculating gas and some hydrogen loss will result, both of which will leak into a combustion zone 46, and be combusted and exhausted with the excess oxidant as exhaust gas. Make-up steam can be injected into the compartment between barriers 42 and 44 in order to compensate for the $H_2O$ and $H_2$ losses during the energy recovery mode. The thermal energy of the oxidant exhaust can be recovered to generate make-up steam, stored as sensible heat, used for covering system heat losses, or used for other purposes. Blowers 48 positioned in a low temperature region effect the anode recirculation.

The inner electrode, or the electrolysis anode 16 during the energy storage mode and the oxidant cathode 36 during the energy recovery mode, of the electrochemical cell apparatus 1 and 2 can be comprised of a porous, doped ceramic of the perovskite family, e.g., doped lanthanum chromite, lanthanum manganite, or the like. The solid oxide electrolyte 14 and 34 can be comprised of a substantially gas-tight oxygen ion conductive material, e.g., yttria or scandia stabilized zirconia. The outer electrode, or the electrolysis cathode 12 during the energy storage mode and the fuel anode 32 during the energy recovery mode, can be comprised of a porous nickel-zirconia cermet material. A porous calcia stabilized zirconia support for the inner electrode can optionally be used. A substantially gas-tight interconnection (not shown) for electrically connecting adjacent electrochemical cells made of doped lanthanum chromite can also optionally be used. A more detailed description of the materials and construction of exemplary electrochemical cells, such as high temperature, solid oxide electrolyte fuel cells can be found in U.S. Pat. Nos. 4,490,444 (Isenberg) and 4,751,152 (Zymboly), which are hereby incorporated by reference herein in their entireties.

Figures 3, 3A:
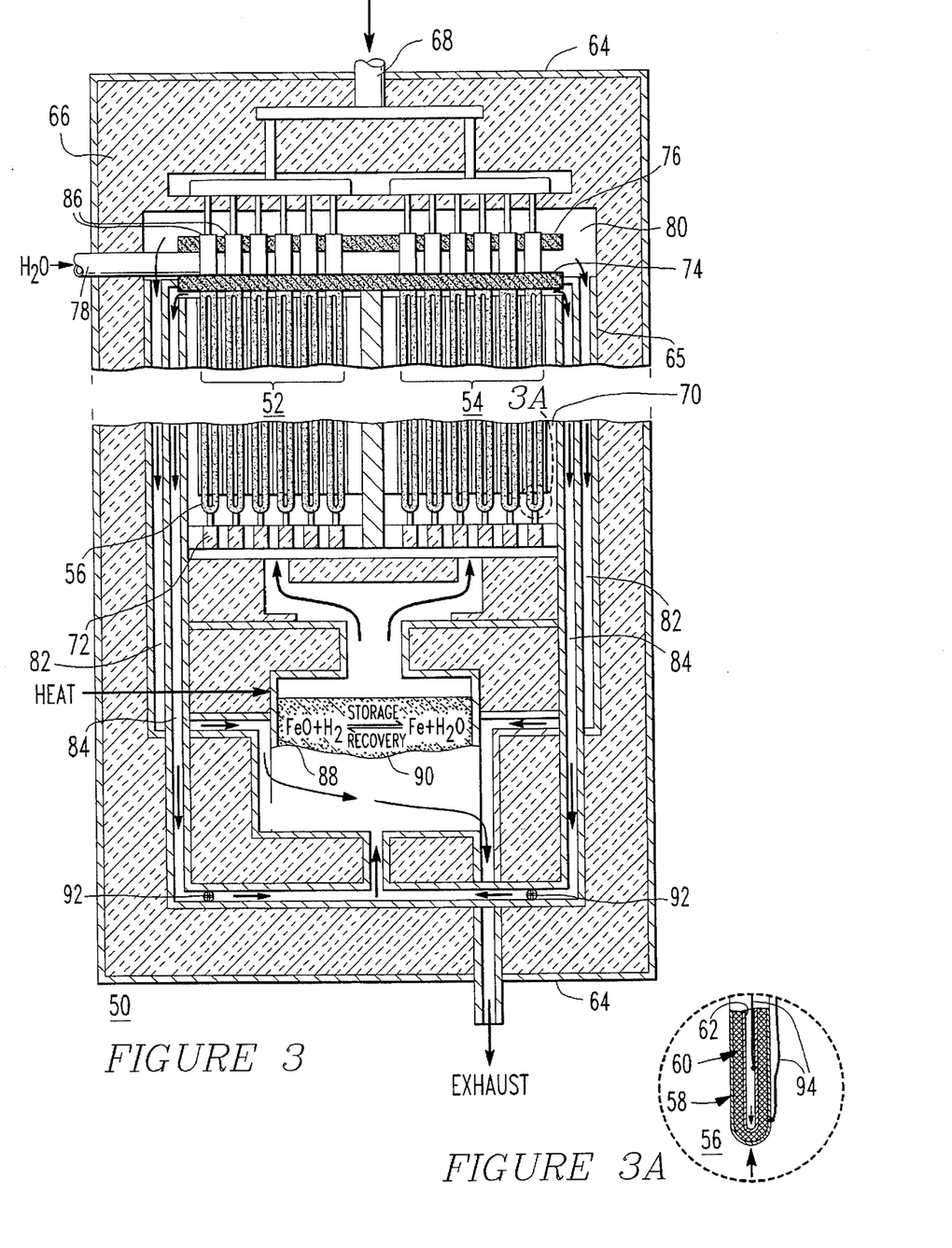
FIG. 3 is a sectional view of an exemplary electrical energy storage and conversion system of the invention which can be operated in an energy storage mode and an energy recovery mode.

Referring now to FIG. 3, an electrochemical energy conversion and storage cell (ECAS) apparatus 50 is shown, such as a high temperature, solid oxide electrolyte fuel cell generator apparatus. The apparatus 50 can be operated in two modes, an energy storage mode and an energy recovery mode. A third mode is possible such as a natural gas fuel cell mode as described in U.S. patent application Ser. No. 08/378,298 (Isenberg) entitled *A Hydrocarbon Reformer For Electrochemical Cells* filed concurrently herewith and previously incorporated by reference. The ECAS apparatus 50 shown contains two electrochemical cell bundles 52 and 54, each cell bundle containing a plurality of parallel, axially elongated, tubular electrochemical cells 56. Each cell has a porous exterior electrode 58 (i.e., an electrolysis cathode or fuel anode), a porous interior electrode 62 (i.e., an electrolysis anode or air cathode), and a gas-tight solid oxide electrolyte 60 between the electrodes. The solid oxide electrolyte is a solid solution of oxides selected for its high ratio of ionic conductivity to electronic conductivity, high oxygen ion to cation conductivity, and gas-tightness as a barrier to the gases in the anode and cathode compartments so that direct reaction does not occur.

As is well known, the construction of the electrochemical cells 56 can include: an optional inner porous support tube (not shown) of calcia stabilized zirconia about 1.0–2.0 mm thick; an inner porous electrolysis anode or air cathode 62 generally surrounding the support tube of doped perovskite oxides, e.g. $LaMnO_3$, $CaMnO_3$, $LaNiO_3$, $LaCoO_3$, $LaCrO_3$ or the like including dopants of Sr, Ca, Co, Ni, Fe, Sn, Ba, Cr, Ce or the like, about 0.05 mm–5.0 mm thick; a gas-tight solid oxide electrolyte 60 of yttria or scandia stabilized zirconia about 0.001 mm–0.1 mm thick surrounding most of the outer periphery of the inner electrode; a gas-tight interconnection material (not shown) of doped $LaCrO_3$ including dopants of Ca, Sr, Ba, Mn, Mg, Ti, Fe, Co and Ni about 0.001–0.5 mm thick on a selected radial portion of the inner electrode in a discontinuous portion of the solid oxide electrolyte for electrical interconnection between adjacent cells; an outer electrolysis cathode or fuel anode 58 of nickel-zirconia or cobalt-zirconia cermet about 0.1 mm thick substantially surrounding the solid oxide electrolyte and discontinuous in the interconnection region to avoid direct electrical communication between the outer electrode and both the interconnection and inner electrode; an optional top layer (not shown) of nickel-zirconia or cobalt-zirconia cermet about 0.1 mm thick is over the interconnection; and an optional electrically conductive nickel fiber felt about 1 mm thick over the interconnection, thereby forming an electrochemical cell. A more detailed description of the materials and methods of construction of an electrochemical cell and electrical interconnections between adjacent cells can be found in U.S. Pat. No. 4,395,468 (Isenberg), which is hereby incorporated by reference herein in its entirety.

An outer metallic housing 64 of steel generally surrounds the entire ECAS apparatus 50. An inner housing 65 of high temperature resistant metal such as Inconel generally surrounds a plurality of chambers, including a cell chamber 70, a combustion/exhaust chamber 80, and a Fe/FeO energy storage bed chamber 88. Thermal insulation 66 such as low density alumina, is contained within the outer housing. Penetrating the outer housing and thermal insulation is a tubular gaseous oxidant inlet 68 for an oxidant such as air or $O_2$, and a gaseous steam inlet 78. Ports can also be provided for electrical leads (not shown).

The cell chamber 70 containing the cell bundles 52 and 54 extends between a gas distribution plate 72 and porous barriers 74 and 76, such as ceramic fiber boards or the like. The electrochemical cells 56 extending between distribution plate 72 and porous barriers 74 and 76 and have open ends 86 in the combustion/exhaust chamber 80, and closed ends in the cell chamber 70 at the bottom of the cells near the distribution plate 72. Penetrating the compartment between the porous barriers 74 and 76 is a make-up steam inlet 78, used to inject make-up steam so that transfer of $H_2$ produced during electrolysis operations in the energy storage mode and $H_2O$ produced during fuel cell operations in the energy recovery mode is not substantially lost through the porous barrier to a combustion/exhaust chamber 80 and exhausted in an exhaust channel 82 as hot combusted exhaust gas.

Beneath the porous barriers is a hydrogen gas (electrolysis mode) or steam (fuel cell mode) recirculation channel 84. The recirculation channel 84 connects to at least one Fe/FeO energy storage bed chamber 88, containing a packed bed of iron oxide/iron metal compacts or pellets 90. The Fe/FeO energy storage bed chamber 88 can be tubular, annular, planar or the like. The energy storage bed 88 can be sized in wide margins and is governed by ECAS apparatus size and other operational considerations. For example, a smaller bed can be thermally integrated into the apparatus more easily but it would have less energy storage capacity. The Fe/FeO pellets can be configured in various shapes, such as irregular lumps, spherical, oblate spheroid, annular ("Raschig rings"), wagon wheel or the like. The Fe/FeO pellets can also be comprised of impregnated iron oxide/iron metal in high temperature ceramic substrates, such as alumina support material, or better as pure solid Fe/FeO. An active bed volume of 108–240 $m^3$ for a 25 MV electrochemical apparatus is preferred. The actual volume of the Fe/FeO pellets is about 32 $m^3$. The pellet size, shape, strength, porosity, and packing density are important parameters for effective operation in terms of size, structural, thermal and pressure drop characteristics and can be determined by operational analysis. The Fe/FeO energy storage chamber 88 is coupled to recirculation blowers 92 positioned at a low temperature region for recirculation of the gases in the recirculation channel 84 to a gaseous feed inlet to the electrochemical cells 56.

By way of example, during operation of the ECAS apparatus 50 in the electrolysis or energy storage mode, excess AC electrical energy produced from a power plant during off-peak hours, is converted to DC by conventional methods well known in the art (not shown) and fed through the electrical leads 94 to the electrochemical cells 56 operated at a temperature above 350° C. and about 600° C. to 1000° C. Fresh (preheated) water vapor (steam) is fed through an inlet 78 and passes over the axial portion of the outer electrolysis cathode 58 and is electrochemically reduced to $H_2$ gas and oxygen ions. The hydrogen gas produced is directed to pass from the cell chamber 70 into the recirculation channel 84. Meanwhile, the oxygen ions pass through the solid oxide electrolyte 60 and are electrochemically oxidized at the inner anode 62 to produce $O_2$ which is vented as a by-product at the open ends of the cells into the combustion/exhaust chamber 80 and is exhausted to the atmosphere or recovered, if possible. Make-up steam is injected through an inlet 78 into the compartment between porous barriers 74 and 76 to prevent $H_2$ gas loss by reoxidation in the combustion chamber with exhausted oxygen.

The $H_2$ gas in the recirculation channel 84 is passed through a Fe/FeO energy storage bed 88 containing FeO and reacts at temperatures of about 600° C. to 800° C. to form Fe and $H_2O$ (steam). The $H_2O$ steam is recirculated by blowers 92 in the recirculation channel 84 to the cell chamber 70. The steam is recirculated and electrolyzed over and over again until substantially complete reduction of FeO to Fe and accordingly until substantially complete charging of the Fe occurs. When all the beds 88 of FeO are reduced to Fe (only one bed being shown in FIG. 3), the energy storage capability is exhausted. Only a small amount of injected fresh steam is needed to reduce a large amount of FeO to Fe due to the recirculation of steam to the outer cathode of the electrolysis cell. Thus, in the energy storage mode, excess electrical energy produced from the power plant is stored as chemical energy, not in the form of bulky $H_2$ gas, but in the form of iron (Fe) metal pellets which provide a compact and recoverable energy storage arrangement.

When the electrical energy is needed for electrical power transmission from the power plant, the ECAS apparatus 50 is operated in an energy recovery mode. During operation in the fuel cell or energy recovery mode, stored chemical energy in the form of iron metal is converted via the oxidation of hydrogen, released from the energy storage bed through oxidation of iron (Fe) through incoming steam, in the fuel cell to DC electrical energy and then converted to AC electrical energy by conventional methods for electrical power transmission. Fresh (preheated) water vapor (steam) is fed through inlet 78 and drawn into the recirculation channel 84 by the recirculation blower 92 and then is fed over the Fe/FeO energy storage bed 88 in the previous Fe state at temperatures of about 600° C. to 800° C. to oxidize the Fe to FeO and produce $H_2$ gas. The $H_2$ gas produced is passed over the exterior fuel anode 58 of the electrochemical cell where it electrochemically reacts along the outer axial length with oxygen ions to produce direct current electrical, heat and $H_2O$, which is, again, circulated through channel 84 to bed 88.

An oxidant, such as air or $O_2$, typically supplied in excess for cooling and/or heat transfer, is fed through inlet 68 and is partially preheated while it flows through the oxidant manifold and conduits which extend down the inside length of the electrochemical cells 56 at temperatures of about 1000° C. The oxidant is discharged into the closed end (bottom) of the electrochemical cells and then reverses direction and electrochemically reacts at the inner air cathode 62 along the inside of the active length of the electrochemical cells, being depleted in oxygen as it approaches the open ends 86 of the cells. The depleted or spent oxidant is discharged into the combustion/exhaust chamber 80 through the open cell ends, where it combusts with some depleted or spent hydrogen which passes through porous barriers 74 and 76 to form a hot combusted exhaust gas which can be directed to pass in an exhaust channel 82 in heat communication with other parts of the electrochemical apparatus, prior to exiting into the atmosphere. Oxygen ions formed by this electrochemical reaction become a part of the solid oxide electrolyte crystal structure and migrate through the solid oxide electrolyte to the exterior fuel anode 58, where the $H_2$ gas supplied from the Fe/FeO energy storage reactor 88 is directed over the axially length of the fuel anode is electrochemically oxidized and electrons are released which flow through an external load circuit to the air cathode, thus generating direct current electrical energy.

The $H_2O$ (steam) produced at the fuel anode 58 during electrochemical reactions is recirculated over and over again in recirculation channel 84 to the Fe/FeO beds 88 until substantially complete oxidation of Fe to FeO occurs, and accordingly until substantially complete discharging of Fe occurs. Only a small amount of injected fresh steam is needed to oxidize a large amount of Fe to FeO due to the recirculation of produced steam. Since the energy recovery mode is exothermic, an excess of air is needed to cool the cells. Further, due to incomplete sealing of the porous barrier, some loss of water vapor from the recirculation gas stream and of depleted hydrogen will occur and combust with the excess air in the combustion chamber. Make-up steam is injected through inlet 78 into the compartment between porous barriers 74 and 76 to minimize $H_2O$ and $H_2$ loss.

Figure 4:
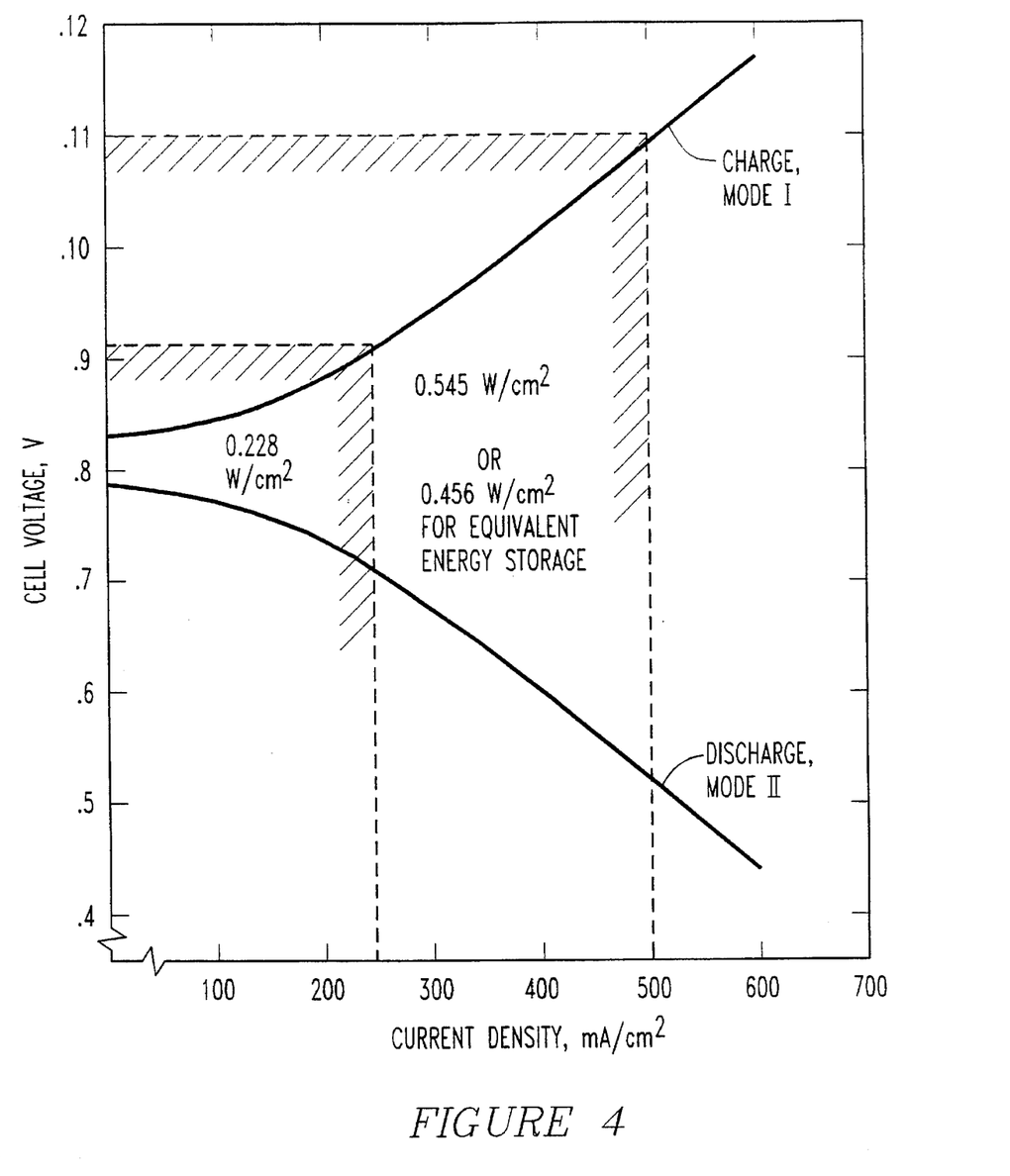
FIG. 4 is a graph of the cell voltage characteristics on charge and discharge of the electrical energy storage and conversion system of the invention.

Referring now to FIG. 4, this figure shows the energy conversion and storage cell voltage characteristics on charge (electrolysis mode) and on discharge (fuel cell mode). The energy efficiency of a charge/discharge cycle depends on the current density during charge and discharge. The surface area under each operating point is the power equivalent (watts). The energy equivalent is obtained by multiplying a time factor (hours). The ratio of watt x hours (input)/watt x hours (output) represents the cell energy efficiency which must also take into consideration additional losses such as gas (steam) losses, heat losses and auxiliary electrical losses from blowers, controls, etc. The system of the invention can be used as an alternative for conventional energy storage applications. The system has the additional ability to act as a natural gas operated fuel cell power plant which offers the advantage of electrochemical energy storage.

The invention disclosure incorporates by reference all of the hereinabove mentioned U.S. patents and U.S. patent applications in their entireties.

The invention having been disclosed in connection with the foregoing variations and examples, additional variations and examples will now be apparent to persons skilled in the art. The invention is not intended to be limited to the variations and examples specifically mentioned, and accordingly reference should be made to the appended claims rather than the foregoing discussion of preferred examples, to assess the spirit and scope of the invention in which exclusive rights are claimed.

We claim:

1. A method of storing electrical energy as chemical energy and recovering electrical energy from the stored chemical energy by operating an electrochemical cell in two modes, an energy storage mode and an energy recovery mode, comprising:

I. In the energy storage mode,
      (a) supplying external electrical energy to electrical leads and $H_2O$ (steam) gas to a cathode of at least one electrochemical cell operating as an electrolysis cell using a solid oxide electrolyte between an anode and the cathode, said electrolysis cell operating at a temperature of between about 600° C. to 1200° C., to produce $H_2$ gas along the cathode and $O_2$ gas along the anode;
      (b) passing the $H_2$ gas produced along the cathode of the electrolysis cell into a energy storage reactor containing iron oxide operating at a temperature of between about 600° C. to 800° C., to produce iron metal in the energy storage reactor and $H_2O$ (steam);
(c) recirculating the $H_2O$ (steam) produced in the energy storage reactor to the cathode of the electrolysis cell to be electrolyzed; and
(d) repeating steps (a) to (c) until substantially complete conversion of iron oxide to iron metal, for chemical energy storage of electrical energy;

II. In the energy recovery mode,
(e) supplying $H_2O$ (steam) gas to said energy storage reactor containing iron metal operating at a temperature of between about 600° C. to 800° C., to produce iron oxide in the energy storage reactor and $H_2$ gas;
(f) passing the $H_2$ gas to a fuel anode of said at least one electrochemical cell operating as a fuel cell and supplying $O_2$ gas or air to an air cathode of said at least one electrochemical cell operating at a temperature of between about 600° C. to 1200° C., to conduct electrical energy along the external leads and produce $H_2O$ (steam) along the fuel anode;
(g) recirculating the $H_2O$ (steam) produced at the fuel anode of the fuel cell to said energy storage bed;
(h) repeating steps (e) to (g) until substantially complete conversion of iron metal to iron oxide and $H_2$ gas for electrical energy recovery form chemical energy storage; and,
(i) recovering said electrical energy produced.

2. The method of claim 1, wherein the thermal energy is supplied from external sources and the electrical energy is supplied from a power plant.

3. The method of claim 1, wherein said electrolysis cell anode and said fuel cathode are comprised of lanthanum manganite, said solid oxide electrolyte is comprised of yttria or scandia stabilized zirconia, and the electrolysis cell cathode and fuel cell anode are comprised of nickel-zirconia cermet.

4. The method of claim 1, wherein the $O_2$ gas produced in step (a) is recovered as a useful by-product.

5. An electrochemical energy storage device, comprising:
at least one solid oxide electrolyte, electrolysis cell including an anode, a cathode and a solid oxide electrolyte between said anode and cathode of the cell, and electrical leads connected to an external circuit from said anode to said cathode, and operating at a temperature to effectively electrolyze incoming $H_2O$ (steam) to $H_2$ gas and $O_2$ gas;
at least one energy storage reactor including iron oxide/iron metal materials in the iron oxide state connected to said at least one electrolysis cell operating at a temperature to effectively react with the produced $H_2$ gas during electrolysis to reduce iron oxide to charged iron metal and produce water vapor (steam).

6. The device of claim 5, further comprising:
a recirculation channel from said energy storage reactor to said electrolysis cell to recirculate the water vapor (steam) produced during energy storage to said electrolysis cell for electrolysis.

7. The device of claim 5, wherein said electrolysis cell is tubular and said anode defines the inner walls of the tube, said cathode defines the outer walls of the tube, and said solid oxide electrolyte is between the anode and cathode.

8. The device of claim 5, wherein said anode of the electrolysis cell is comprised of lanthanum manganite, the solid oxide electrolyte is comprised of yttria or scandia stabilized zirconia, and the cathode is comprised of nickel-zirconia cermet.

9. The device of claim 5, wherein said electrolysis cell is operated at temperatures between about 600° C. and 1200° C.

10. The device of claim 5, wherein said energy storage reactor is operated at temperatures between about 600° C. and 800° C.

11. The device of claim 5, wherein said iron oxide/iron metal materials are pellets.

12. An electrochemical energy recovery device, comprising:
at least one energy storage reactor including iron oxide/iron metal materials in the iron metal state operating at a temperature to effectively react with incoming $H_2O$ (steam) to effectively oxidize iron metal to iron oxide and produce $H_2$ gas;
at least one solid oxide electrolyte, fuel cell connected to said energy storage reactor, said fuel cell including an anode, a cathode and a solid oxide electrolyte between said anode and cathode of the cell, and electrical leads connected to an external circuit from said anode to said cathode, and operating at a temperature to effectively convert the $H_2$ gas produced from said energy storage reactor to electrical energy and $H_2O$ (steam).

13. The device of claim 12, further comprising:
a recirculation channel from said fuel cell to said energy storage reactor to recirculate the water vapor (steam) produced during fuel cell operation to said energy storage reactor.

14. The device of claim 12, wherein said fuel cell is tubular and said cathode defines the inner walls of the tube, said anode defines the outer walls of the tube, and said solid oxide electrolyte is between the anode and cathode.

15. The device of claim 12, wherein said cathode of the fuel cell is comprised of lanthanum manganite, the solid oxide electrolyte is comprised of yttria or scandia stabilized zirconia, and the anode is comprised of nickel-zirconia cermet.

16. The device of claim 12, wherein said fuel cell is operated at temperatures between about 600° C. and 1200° C.

17. The device of claim 12, wherein said energy storage reactor is operated at temperatures between about 600° C. and 800° C.

18. The device of claim 12, wherein said iron oxide/iron metal materials are pellets.

19. An energy conversion and storage system, comprising the energy storage device of claim 6 and the energy recovery device of claim 13, wherein the energy storage and energy recovery devices are one and the same and operated in reverse modes.

20. An electrochemical energy conversion and storage device operational in two modes, an energy recovery mode and an energy storage mode, comprising:
an electrochemical cell chamber, the cell chamber containing at least one electrochemical cell bundle, the cell bundle containing a plurality of parallel, axially elongated, interconnected electrochemical cells, each cell including a porous exterior electrode, a porous interior electrode, and a gas-tight solid oxide electrolyte between the two electrodes;
a combustion chamber connected to the cell chamber;
at least one combustion exhaust channel connected from the combustion chamber to the atmosphere;
at least one energy storage chamber connected to the cell chamber, the energy storage chamber containing either iron oxide in the energy storage mode of operation or iron metal in the energy recovery mode of operation;

at least one recirculation gas channel connected from outside of the porous exterior electrode in the cell chamber to the energy storage chamber;

a steam inlet connected to the outside of the porous exterior electrode in the cell chamber;

an oxidant inlet connected to the inside of the porous interior electrode in the cell chamber; and, electrical leads connected from the cell bundles in the cell chamber to an external circuit, in which the device can be operated in an energy storage mode by supplying direct current electrical energy from the external circuit through the leads to the electrochemical cells and steam through the steam inlet to the porous exterior electrode and providing the energy storage chamber in the iron oxide state, and in which the device can be operated in an energy recovery mode by providing the energy storage chamber in the iron state and supplying steam through the steam inlet to the energy storage chamber and an oxidant through the oxygen inlet to the porous interior electrode and recovering direct current electrical energy from the electrochemical cells through the leads to the external circuit.

* * * * *